United States Patent [19]

Borgia

[11] Patent Number: 5,575,562
[45] Date of Patent: Nov. 19, 1996

[54] SPLATTER PROOF BLENDER SKIRT

[76] Inventor: Dawn Borgia, 4611 Dominion Dr., Naples, Fla. 33962

[21] Appl. No.: 567,032
[22] Filed: Dec. 4, 1995
[51] Int. Cl.⁶ .................................................. B01F 15/00
[52] U.S. Cl. ........................................ 366/347; 366/129
[58] Field of Search ................................. 366/347, 129, 366/348, 349; 99/348

[56] References Cited

U.S. PATENT DOCUMENTS

| | | | |
|---|---|---|---|
| 2,193,356 | 3/1940 | Green | 366/347 |
| 2,486,320 | 10/1949 | Ost | 366/347 |
| 2,504,727 | 4/1950 | Post | 366/347 |
| 2,517,648 | 8/1950 | Franke | 366/347 |
| 4,155,656 | 5/1979 | Kramer | 366/347 |
| 4,549,811 | 10/1985 | Schiffner et al. | 366/347 |

Primary Examiner—Robert W. Jenkins
Attorney, Agent, or Firm—Merrill N. Johnson

[57] ABSTRACT

A splatter-proof blender skirt has a splatter-protective skirt (1) that fits expansively around and over food-preparation containers (5) while being suspended from an electric blender (3) with attachment straps (6, 26) which are attached to a top portion (2) of the skirt and put under a handle (8) or at a hand-holding position (7) on top of the electric blender.

18 Claims, 2 Drawing Sheets

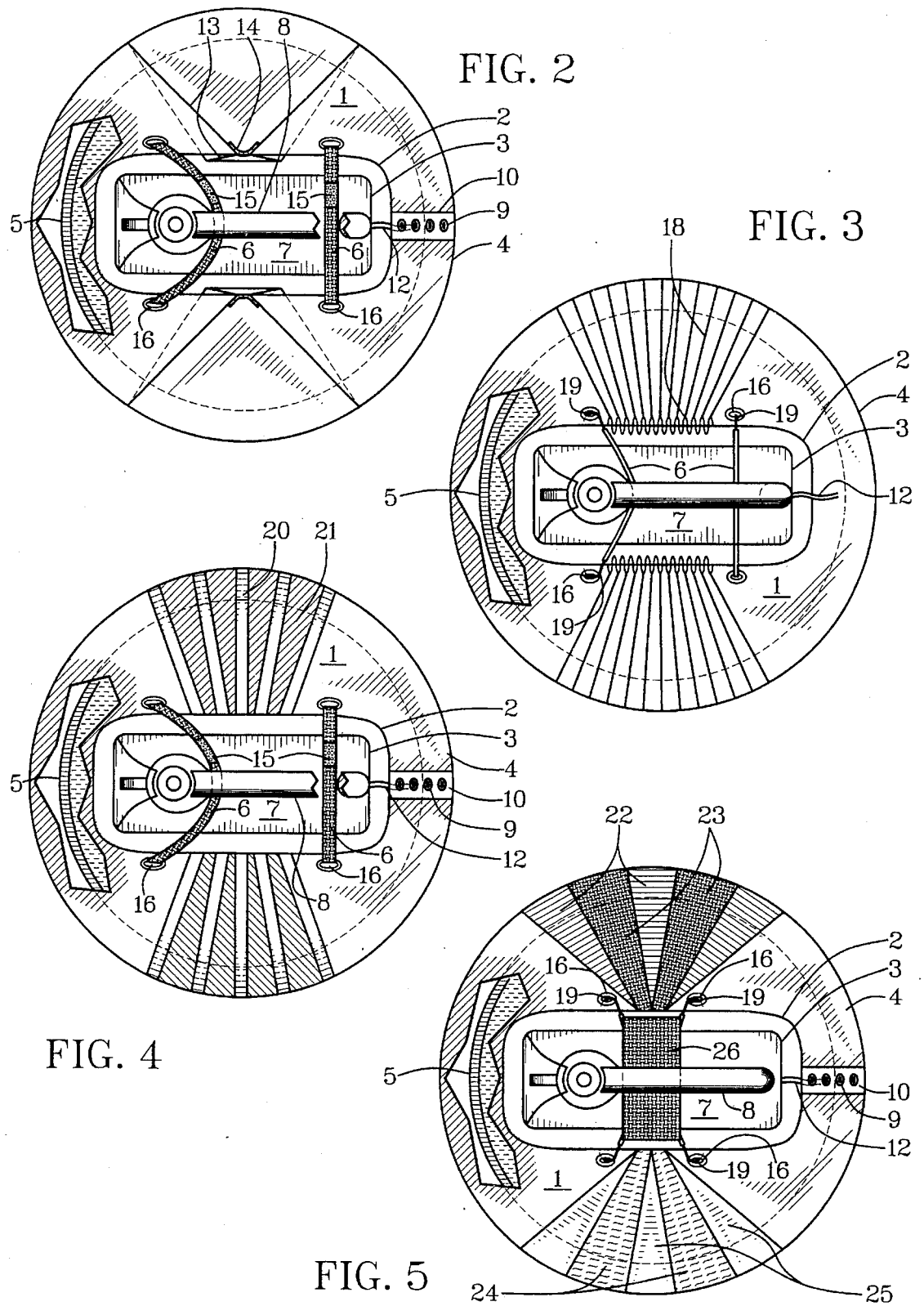

SPLATTER PROOF BLENDER SKIRT

BACKGROUND OF THE INVENTION

1. Field of the Invention

This invention relates to preventing food from splattering when being prepared with a hand-held electric food blender or mixer.

2. Description of Related Art

Various covers have been devised for mixer bowls in which rotational mixer shafts are inserted for preparing food. None that are known, however, are structured to be attachable to a hand-held electric food blender or mixer in the manner taught by this invention.

Instead, the covers that have been made available previously are limited by attachment to tops of particular types and shapes of bowls. This prevents them from being attached to a hand-held blender or mixer for quick and easy prevention of food-splatter wherever desired and with whatever type of container desired.

This invention also allows the frequent need for controllably partial immersion of mixer shafts into food. Further yet, it allows clean-spinning of mixer shafts that is often desirable without splattering food.

Examples of bowl covers different from this invention are described in the following patent documents. U.S. Pat. No. 2,504,727, issued to Post on Apr. 18, 1950, taught a split-circle diaphragm bordered by a spring wire that allowed resilient spreading from one side to allow entry of mixer shafts between two half-circle covers. U.S. Pat. No. 2,486,320, issued to Ost on Oct. 25, 1949, described an open-top shower-cap type of cover with outside edges that fit around a top of a bowl and allowed an eggbeater type of manual mixer to be inserted though the open top. U.S. Pat. No. 2,517,648, issued to Franke on Aug. 8, 1950 disclosed a flat, rigid circular lid with hinges for lifting one side to allow access to a bowl covered by the lid and with two orifices into which mixer shafts were inserted from a bottom side of the lid before attachment to an electric mixer that was not hand-held but positional on a surface. U.S. Pat. No. 2,193,356, issued to Green on Mar. 12, 1940, taught a truncate-conical fan that spread circumferentially over a bowl at a circular base and surrounded tops of mixer shafts at an open bottom.

SUMMARY OF THE INVENTION

In light of product deficiencies that have existed and that continue to exist in this field, objectives of this invention are to provide a splatter-proof blender skirt which:

Can be attached quickly and easily to hand-held blenders which are normally used for mixing and blending food for various cooking and preparation of food in kitchen-type conditions;

Can be used for covering a wide variety of types and sizes of containers and bowls;

Allows partial or total immersion of mixer-shaft heads into food controllably with splatter-proof protection wherever the food is contained while being mixed, blended or otherwise prepared;

Allows spin-cleaning of mixer shafts and heads without splattering food when being removed from containers of food;

Can be removed quickly and easily;

Can be washed, wiped or otherwise cleaned easily and quickly without damage; and Can be used with a wide variety of table-top mixers and blenders that are not hand-held.

This invention accomplishes these and other objectives with a splatter-proof blender skirt that fits expansively around and over food-preparation containers while being suspended from around an electric blender with straps which are attached to a top of the skirt and put under a handle on top of the electric blender.

BRIEF DESCRIPTION OF DRAWINGS

This invention is described by appended claims in relation to description of a preferred embodiment with reference to the following drawings which are described briefly as follows:

FIG. 2 is a partially cutaway top view of a pleated-material embodiment covering a food-preparation container;

FIG. 3 is a partially cutaway top view of a gathered-material embodiment covering a food-preparation container;

FIG. 4 is a partially cutaway top view of a straight-strut embodiment covering a food-preparation container; and FIG. 5 is a partially cutaway top view of a triangular-strut embodiment having optionally either transparent or non-transparent triangular struts in covering relationship to a food-preparation container;

DESCRIPTION OF PREFERRED EMBODIMENTS

Figure 1:
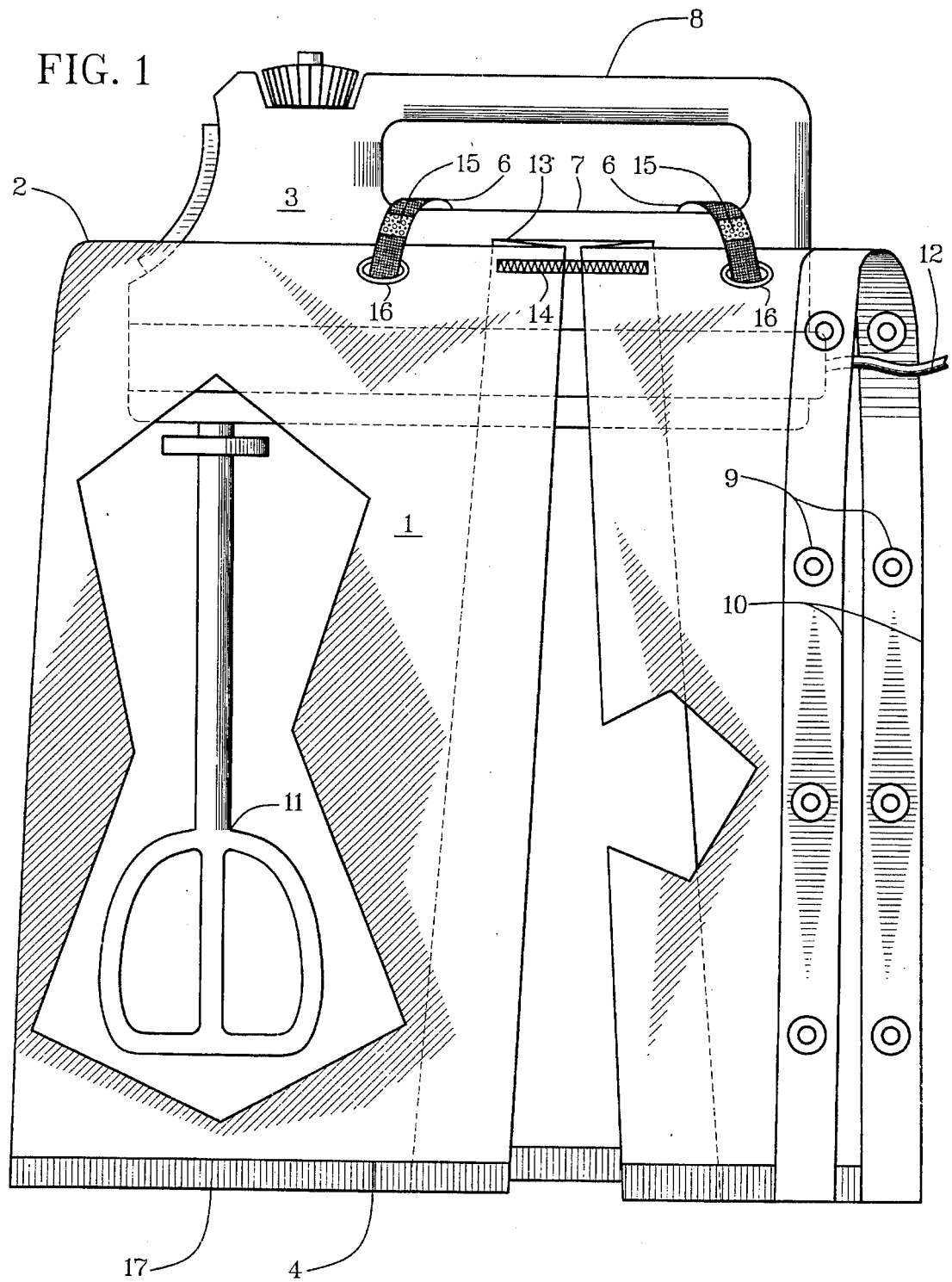
FIG. 1 is a partially cutaway side elevation view of a pleated embodiment.

Reference is made first to FIGS. 1–2. A splatter-protective skirt 1 has a top portion 2 that is sized and shaped to fit designedly around a body of a hand-held electric blender 3 and a bottom portion 4 that is expansive to cover desired portions of a design range of sizes and shapes of food-preparation containers 5. Material for construction of the splatter-protective skirt 1 is preferably plastic but can be any suitable type of material. At least one attachment line 6 is attachable to designedly opposite sides of the top portion 2 of the splatter-protective skirt 1.

To hold the splatter-protective skirt 1 in a splatter-protective position intermediate the body of the electric blender 3 and the desired portions of the design range of sizes and shapes of food-preparation containers 5, the attachment line 6 is positioned proximate a hand-holding position 7 on a top of the hand-held electric blender 3. For most use-conditions, the hand-holding position 7 is under a handle 8 that is raised on one or more handle pillars above the hand-held electric blender 3. Some blenders 3, however, do not have raised handles 8. For blenders 3 without raised handles, including table-top types and some types designed for use as either table-top or hand-held blenders 3, attachment lines 6 are positioned on such hand-holding position 7 as exists on a top of an electric blender 3.

The embodiment depicted in FIG. 1 has side fasteners 9 of a desired type on circumferential ends 10 of either a wraparound or an endless form of the splatter-protective skirt 1. Circumferential ends 10 that can be fastened together or unfastened to allow access to mixer blades 11 while the splatter-protective skirt 1 is on or not on the electric blender 3. Circumferential ends 10 also allow convenient extension of an electric cord 12 from the electric blender 3 to an electrical socket.

A pleated embodiment depicted in FIG. 1 preferably has pleating 13 on each side. Preferably also, the pleating 13 is held together at the top portion 2 with resilient binding material 14 to provide desirably close contact with the electric blender 3 while allowing expansion to cover the design range of sizes and shapes of food-preparation containers 5.

The attachment lines 6 are preferably flexible straps that are sectioned members that can be fastened together with a design plurality of designedly matching hooks 15 such as VELCRO® hook and loop fasteners. Attachment orifices 16 can be provided at the top portion 2 of the splatter-protective skirt 1 for use of whatever type of attachment line 6 is desired.

Reinforcement sections 17 can be provided at bottoms 4, various ends and attachment orifices 16. At the bottom portion 4, the reinforcement section 17 can be designedly heavy to weight down the bottom portion 4 on the desired portions of the design range of sizes and shapes of food-preparation containers 5.

Referring to FIG. 3, gathering 18, preferably held together with resilient cord at the top portion 2, can be employed to allow expansion at the bottom portion 4 while the top portion 2 is held in close proximity to the electric blender 3. This splatter-protective skirt 1 with gathering 18 can be endless as shown or can have ends 10 as described in relation to FIGS. 1–2. Depicted also in FIG. 3, cord-type attachment lines 6 can be employed. The cord-type lines 6 can be resilient and attached with hooks 19 positioned in the attachment orifices 16 at either or both ends as shown.

Referring to FIG. 4, the splatter-protective skirt 1 can have designedly stiff struts 20 extended from top-to-bottom and constructed of relatively flexible and optionally transparent or translucent material. The struts 20 can be joined with straight resilient material 21.

Referring to FIG. 5, designedly triangular struts 22 can be employed and joined with either triangular flexible material 23 or triangular resilient material 24. Further, transparent triangular struts 25 can be employed according to design preferences. Shown also in FIG. 5 is an optionally single fastener line 26 that can be attached with a plurality of attachment means such as the hooks 19 that are illustrated. The single fastener line 26 can be wider than attachment lines 6. The same or different attachment orifices 16 can be employed with different types of fastener lines such as 6 and 26, depending on design preferences, provided they fit over a top of the electric blender 3 proximate the hand-holding position 7.

A new and useful splatter-proof blender skirt having been described, all such modifications, adaptations, substitutions of equivalents, combinations of parts, pluralities of parts, applications and forms thereof as described by the following claims are included in this invention.

I claim:

1. A splatter-proof blender skirt comprising:

a splatter-protective skirt having a top portion of the splatter-protective skirt that is sized and shaped to fit designedly around a body of a hand-held electric blender and a bottom portion of the splatter-protective skirt that is expansive to cover desired portions of a design range of sizes and shapes of food-preparation containers;

at least one attachment line that is attachable to designedly opposite sides of the top portion of the splatter-protective skirt; and the at-least-one attachment line is positioned proximate a hand-holding position on a top of the hand-held electric blender to hold the splatter-protective skirt in a splatter-protective position intermediate the body of the hand-held electric blender and the desired portions of the design range of sizes and shapes of food-preparation containers.

2. A splatter-proof blender skirt as described in claim 1 wherein:

the top portion of the splatter-protective skirt is expansive in design to fit around the body of the hand-held electric blender; such that the splatter-protective skirt can fit around a design range of sizes of hand-held electric blenders and table-top electric blenders.

3. A splatter-proof blender skirt as described in claim 1 wherein:

the splatter-protective skirt is pleated to allow expansion to fit onto a design range of sizes of blenders and to cover desired portions of a design range of sizes and shapes of food-preparation containers in a splatter-protective position intermediate bodies of the design range of sizes of blenders and the desired portions of the design range of sizes and shapes of food-preparation containers.

4. A splatter-proof blender skirt as described in claim 3 wherein:

pleating of the splatter-protective skirt is fastened with resilient material to allow expansion to fit onto a design range of sizes of blenders and to cover desired portions of a design range of sizes and shapes of food-preparation containers in a splatter-protective position intermediate bodies of the design range of sizes of blenders and the desired portions of the design range of sizes and shapes of food-preparation containers.

5. A splatter-proof blender skirt as described in claim 1 wherein:

the splatter-protective skirt is gathered with gathering that is fastened with resilient material to allow expansion to fit onto a design range of sizes of blenders and to cover desired portions of a design range of sizes and shapes of food-preparation containers in a splatter-protective position intermediate bodies of the design range of sizes of blenders and the desired portions of the design range of sizes and shapes of food-preparation containers.

6. A splatter-proof blender skirt as described in claim 1 wherein:

the splatter-protective skirt has designedly stiff struts juxtaposed circumferentially and joined with resilient material, such that the top portion of the splatter-protective skirt can be stretched to fit onto a design range of sizes of blenders and to cover desired portions of a design range of sizes and shapes of food-preparation containers in a splatter-protective position intermediate bodies of the design range of sizes of blenders and the desired portions of the design range of sizes and shapes of food-preparation containers.

7. A splatter-proof blender skirt as described in claim 6 wherein:

the designedly stiff struts are designedly triangular, such that a desirably truncate-conical shape can be formed by attachment of the top portion to desired blenders and positioning of the bottom portion in desired relationship to desired food-preparation containers.

8. A splatter-proof blender skirt as described in claim 7 wherein:

the designedly stiff and designedly triangular struts are designedly transparent, such that blending action can be viewed through such struts.

9. A splatter-proof blender skirt as described in claim 1 wherein:

the splatter-protective skirt has designedly stiff triangular struts juxtaposed circumferentially and joined with flexible material, such that the top portion of the splatter-protective skirt can be expanded to fit onto a design range of sizes of blenders and to cover desired portions of a design range of sizes and shapes of food-preparation containers in a splatter-protective position intermediate bodies of the design range of sizes of blenders and the desired portions of the design range of sizes and shapes of food-preparation containers.

10. A splatter-proof blender skirt as described in claim 9 wherein:

the designedly stiff triangular struts are designedly transparent, such that blending action can be viewed through such struts.

11. A splatter-proof blender skirt as described in claim 1 wherein:

the at-least-one attachment line is a sectioned member having opposite ends attached to the designedly opposite sides of the top portion of the splatter-protective skirt and is joinable with a design fastener.

12. A splatter-proof blender skirt as described in claim 11 wherein:

the design fastener is a design plurality of designedly matching hooks.

13. A splatter-proof blender skirt as described in claim 1 and further comprising:

at least one attachment orifice proximate the top portion of the splatter-protective skirt;

a first end of the at-least-one attachment line attached to one side of the top portion of the splatter-protective skirt; and a second end of the at-least-one attachment line having a hook that is positional in the at-least-one attachment orifice in fastening relationship to a second side of the top portion of the splatter-protective skirt.

14. A splatter-proof blender skirt as described in claim 1 and further comprising:

a design plurality of attachment orifices proximate the top portion of the splatter-protective skirt;

the design plurality of attachment orifices being sized and shaped to receive a design range of sizes and shapes of attachment lines.

15. A splatter-proof blender skirt as described in claim 1 wherein:

the splatter-protective skirt is made of a designedly transparent material.

16. A splatter-proof blender skirt as described in claim 1 wherein:

the splatter-protective skirt is made of plastic having design thickness for durability at wear points and for weight at a bottom portion.

17. A splatter-proof blender skirt as described in claim 1 wherein:

the splatter-protective skirt is a wraparound skirt having at least one fastener at opposite circumferential ends of the wraparound skirt.

18. A splatter-proof blender skirt as described in claim 1 wherein:

the splatter-protective skirt is an endless skirt having a top portion that is expansive to fit around a design range of sizes and shapes of electric blenders and a bottom portion that is expansive to fit over and around a design range of sizes and shapes of food-preparation containers.

\* \* \* \* \*